US012686155B2

(12) United States Patent
Shin et al.

(10) Patent No.: US 12,686,155 B2
(45) Date of Patent: Jul. 21, 2026

(54) POLYURETHANE LOGO LABEL MANUFACTURING METHOD AND POLYURETHANE LOGO LABEL ATTACHMENT METHOD

(71) Applicant: BRANITY Co., Ltd., Seoul (KR)

(72) Inventors: Jung Young Shin, Yeongwol-gun (KR); Kyu Sang Kwak, Seongnam-si (KR)

(73) Assignee: BRANITY Co., Ltd., Seoul (KR)

( * ) Notice: Subject to any disclaimer, the term of this patent is extended or adjusted under 35 U.S.C. 154(b) by 74 days.

(21) Appl. No.: 18/784,558

(22) Filed: Jul. 25, 2024

(65) Prior Publication Data

US 2025/0033258 A1    Jan. 30, 2025

(30) Foreign Application Priority Data

Jul. 26, 2023    (KR) ........................ 10-2023-0097692

(51) Int. Cl.
| | |
|---|---|
| *B29C 45/14* | (2006.01) |
| *B29C 45/26* | (2006.01) |
| *B29K 75/00* | (2006.01) |
| *B29K 105/20* | (2006.01) |
| *B29K 667/00* | (2006.01) |
| *C08J 5/12* | (2006.01) |
| *B29L 31/00* | (2006.01) |

(52) U.S. Cl.
CPC ........ *B29C 45/14344* (2013.01); *B29C 45/26* (2013.01); *C08J 5/121* (2013.01); *B29K 2075/00* (2013.01); *B29K 2105/20* (2013.01); *B29K 2667/003* (2013.01); *B29L 2031/723* (2013.01); *C08J 2367/02* (2013.01); *C08J 2475/04* (2013.01)

(58) Field of Classification Search
CPC ................................................ B29C 45/14344
See application file for complete search history.

(56) References Cited

U.S. PATENT DOCUMENTS

| | | | | |
|---|---|---|---|---|
| 5,368,798 | A * | 11/1994 | Mizukoshi | .............. B29C 45/14 |
| | | | | 264/154 |
| 9,757,886 | B2 * | 9/2017 | Middleton | ............... B65D 1/48 |
| 2014/0374953 | A1 * | 12/2014 | Middleton | ......... B65D 81/3453 |
| | | | | 264/275 |

FOREIGN PATENT DOCUMENTS

| | | | | |
|---|---|---|---|---|
| DE | 102015100208 | A1 * | 7/2016 | ....... B29C 45/14467 |
| KR | 10-2049883 | B1 | 1/2020 | |
| KR | 102143946 | B1 * | 8/2020 | .............. G09F 3/03 |
| KR | 10-2200415 | B1 | 1/2021 | |
| KR | 102287076 | B1 * | 8/2021 | .............. G09F 3/02 |

* cited by examiner

*Primary Examiner* — Xiao S Zhao
*Assistant Examiner* — Nicholas J Chidiac
(74) *Attorney, Agent, or Firm* — Heedong Chae; Lucem, PC

(57) ABSTRACT

The present disclosure relates to a polyurethane logo label manufacturing method that includes: a first step of preparing a polyurethane image film printed with a logo; a second step of preparing a wing film laminated by combining a polyurethane film and a PET film; a third step of forming an injection hole for injection into a logo groove of the wing film; a fourth step of film molding option of preparing a mold composed of a top plate, a mid-plate, and a bottom plate; and a fifth step of injection molding of injecting polyurethane resin into the logo groove through the injection inlet of the top plate of the fourth step.

1 Claim, 19 Drawing Sheets

POLYURETHANE LOGO LABEL MANUFACTURING METHOD AND POLYURETHANE LOGO LABEL ATTACHMENT METHOD

CROSS REFERENCE TO RELATED APPLICATION

The present application claims priority to Korean Patent Applications No. 10-2023-0097692, filed Jul. 26, 2023 the entire contents of which are incorporated herein for all purposes by this reference.

BACKGROUND

Technical Field

The present disclosure relates to a polyurethane logo label manufacturing method and a polyurethane logo label attachment method that show a manufacturer or a product source and secure the quality of products by attaching a logo label on the outer surface of products such as clothing or bags.

Description of the Related Art

Logo labels that are attached to the outer side of products such as clothing or bags by sewing, an adhesive, or the like are printed and coated with a manufacturer or a brand name, thereby serving to show the image of the manufacturer and the product source and secure the quality of the product.

Further, logo labels are printed and coated with various patterns and attached to be exposed to the outside of products to have also the effect of decoration.

The more famous the companies are, the more they manufacture and attach name plates of brands such as logos and emblems to products and widely publicize the brands through mass media.

Logos created by designing trades of products, product names, and the name of manufacturers with peculiar letter-forms are formed on metal logo badges and are attached to the casing of various products, thereby showing the brands of the companies that manufacture the products.

Logo labels having such various functions is composed of an aluminum foil layered on a side of a polycarbonate sheet, various decorative patterns printed on the surface of the aluminum foil by screening or offsetting, and epoxy as a coating layer protecting the decorative patterns.

Further, such logo labels are manufactured using various materials and various methods and there are methods such as injection molding, pressing, die casting, and engraving.

In particular, metal labels are recently used a lot because the elegant colors and luxurious image, but they are made of metallic materials, so manufacturing process including cutting, grinding, and polishing is complicated, they are inconvenient to mount and use on products because they are hard and heavy, they may be easily broken by external shock, and when metal is broken, a sharp part protrudes and users are injured in some cases.

Further, since metal labels have low ductility, they are difficult to attach to bending portions of products such as shoes, and even though they are attached to a bending portion of a product, there are protruding portions and they are not matched with the product, so it is bad in terms of design and they are easily separated when hitting against other objects.

Polyurethane (TPU) logo labels having various advantageous are used to solve these problems of metallic logo labels. Polyurethane has hardness that can be variously changed, has excellent tensile strength and tearing strength, is also strong against shock, friction, cutting, and tearing, has excellent flexibility and rebound recovery of shape, has excellent sound and vibration absorption ability, has a wide available temperature, has high elasticity, has high elongation, and is particularly a innocuous eco-friendly material, so polyurethane is generally used as a replacement for PVC.

Further, polyurethane has excellent adhesion to metal and various materials, has excellent chemical resistance, ozone resistance, oil resistance, has also excellent formability, and has also excellent color representation.

Polyurethane (TPU) logo labels replacing metallic logo labels are used a lot because of these advantages, but there are some technical problems to be solved. Since polyurethane logo labels are better in ductility and elasticity than metallic logo labels, there are various methods of attachment to cloth such as adhesion or sewing, but when a logo portion is manufactured thick to give stereoscopic effect to a logo, the logo label is still not naturally attached to cloth without a sense of mismatch. That is, when a stereoscopic thick logo label is attached even though a polyurethane material having excellent ductility is used, the interface of the cloth is wrinkled, or when such a logo label is attached to a curved portion, the logo label is unbalanced and deformed in some cases. In order to solve this problem, adhesiveness to cloth increased and flexibility of a coupled portion is increased by forming a thin film like a wing on the bottom of a relatively thick logo label, thereby preventing wrinkling of an interface or unbalanced deformation. However, clothes are used for a long period of time or laundered many times, the adhesive portion of a film and a logo label is separated in many cases.

This is because the adhesion of the adhesive component between a film and a logo label is low, but is also because an adhesive, a film, and a logo label are separable materials, so they cannot resist variation of temperature that is repeated during use of clothes due to different coefficients of thermal expansion.

Accordingly, the thinner the film that is attached to the bottom of a logo label, the higher the ductility, so when a logo label is attached to cloth, the logo label deforms actively to variation of the cloth without a visual sense of mismatch and is more firmly coupled to the cloth, but the thinner the film, the more difficult it is to increase the cohesion (adhesion) of the film and a logo label.

SUMMARY

The present disclosure has been made in an effort to solve the problems described above and an objective of the present disclosure is to provide a logo label manufacturing method that can increase cohesion between a logo label and a film by forming a thin film on the bottom of the logo label and coupling the thin film through injection molding in the process of manufacturing a stereoscopic logo label, and to provide a logo label attachment method that reduces a sense of mismatch due to flexibility when a logo label is attached to cloth, and prevents a logo label from separating from cloth and keeps the attachment portion watertight even though the cloth with the logo label attached is laundered many times and used for a long period of time.

In order to achieve the objectives, the present disclosure provides a polyurethane logo label manufacturing method that includes: a first step of preparing a polyurethane image film printed with a logo; a second step a of preparing wing film laminated by combining a polyurethane film and a PET film; a third step of forming an injection hole for injection into a logo groove of the wing film; a fourth step of film molding option of preparing a mold composed of a top plate, a mid-plate, and a bottom plate, that is, of preparing a bottom plate on which a logo groove having the same shape as a logo and having depth by a thickness of the logo is formed and a seat groove having the same shape as the wing film and having a depth by a thickness of the wing film is formed, of preparing a mid-plate closing the logo groove and the seat groove by being assembled to overlap the bottom plate, having a path groove, through which polyurethane resin can flow, on a top thereof, and having an injection hole formed at the path groove to be connected with the injection hole of the wing film, of preparing a top plate closing the path groove by being assembled to overlap the mid-plate and having an injection inlet, through which polyurethane resin can be injected, on a top thereof, and then of inserting the image film onto a bottom of the logo groove of the bottom plate, and of inserting the wing film into the seat groove, thereby mounting the wing film into the mold; and a fifth step of injection molding of injecting polyurethane resin into the logo groove through the injection inlet of the top plate of the fourth step such that the portion between the image film and the wing film is filled with the polyurethane resin, a logo of the image film is transcribed and thermally bonded to a front of the polyurethane resin by heat of the polyurethane resin, a polyurethane film of the wing film is partially melted by heat of the polyurethane resin and integrally thermally bonded to a bottom of the polyurethane resin, and then of separating the mold.

Further, the present disclosure provides a polyurethane logo label attachment method that includes: a first step of preparing a logo label with a wing film thermally bonded on a bottom thereof through injection molding; a second step of forming logo-shaped bored portion by cutting cloth, to which the logo label is supposed to be attached, into the same shape as the first logo of the first step; and a third step of placing the logo label of the first step such that the wing film is positioned inside the cloth at the logo-shaped bored portion of the cloth, of applying a urethane primer layer and a hot melt layer to the transparent wing film, and then of integrally thermally bonding the cloth and the wing film by heating and pressing the portion of the cloth where the logo-shaped bored portion is formed.

Further, the present disclosure relates to a polyurethane logo label manufacturing method that includes: a first step of preparing a polyurethane image film printed with a logo; a fourth step of film molding option of preparing a mold composed of a top plate, a mid-plate, and a bottom plate, that is, of preparing a bottom plate on which a logo groove having the same shape as a logo and having depth by a thickness of the logo is formed, of preparing a mid-plate closing the logo groove and a seat groove by being assembled to overlap the bottom plate, having a path groove, through which polyurethane resin can flow, on a top thereof, and having a plurality of leg grooves formed at the path groove, of preparing a top plate closing the path groove by being assembled to overlap the mid-plate and having an injection inlet, through which polyurethane resin can be injected, on a top thereof, and then of inserting the image film onto a bottom of the logo groove of the bottom plate, thereby mounting the wing film into the mold; and a fifth step of injection molding of injecting polyurethane resin into the logo groove through the injection inlet of the top plate of the fourth step such that the logo groove and the leg holes of the path groove are filled with the polyurethane resin, a logo of the image film is transcribed and thermally bonded to a front of the polyurethane resin by heat of the polyure-thane resin, and a plurality of legs is integrally formed by the number of leg holes while the polyurethane resin hardens.

Further, the present disclosure relates to a polyurethane logo label attachment method that includes: a first step of preparing a logo label with a plurality of legs integrally formed on a bottom thereof through injection molding; a second step of forming a group of holes by forming a plurality of leg holes on cloth, to which the logo label is supposed to be attached, into the same shape as a cross-section of the legs of the logo label of the first step; a third step inserting the legs of the logo label of the first step into the group of holes of the second step, respectively; and a fourth step of separately preparing and coupling a polyure-thane film to end portions of the legs protruding in the holes of the third step, respectively, applying a urethane primer layer, applying urethane hot melt onto the urethane primer layer, and then integrally thermally bonding the legs and the polyurethane film by heating a pressing.

According to the present disclosure, since a thin wing film formed through injection molding and having high cohesion is coupled to the bottom of a polyurethane logo label, when the logo label is attached to cloth, the logo label flexibly deforms with deformation of the cloth, whereby a visual sense of mismatch is decreased. Further, since the wing film and the logo label is combined in a resin state through injection molding rather than an adhesive, the cohesion is excellent. Further, since when the logo label is attached to cloth, the wing film is actually thermally bonded without swing, the cohesion with the cloth is increased and a visual aesthetic sense is also excellent. Further, watertightness between the wing film made of a polyurethane resin and cloth is also maintained well.

BRIEF DESCRIPTION OF THE DRAWINGS

The above and other objectives, features and other advan-tages of the present disclosure will be more clearly under-stood from the following detailed description when taken in conjunction with the accompanying drawings, in which.

DETAILED DESCRIPTION

Figure 1:
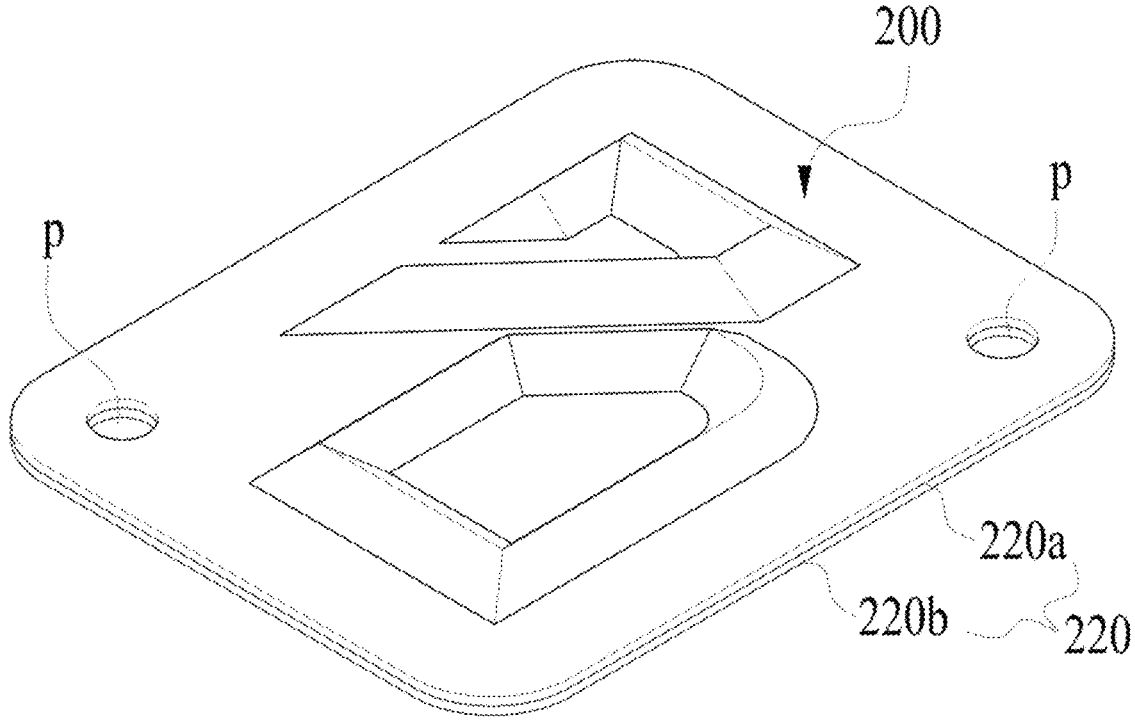
FIG. 1 shows an injection-molded logo label according to an embodiment of the present disclosure.

The present disclosure is described hereafter in detail with reference to the accompanying drawings.

A logo label according to the present disclosure is implemented through INMOLD molding. INMOLD (hereafter, referred to as IMD) provides a great number of advantages such as flexibility in designing and productivity in comparison to other decoration methods that are performed after molding. These advantages include flexibility in designing, implementation of multiple colors, effects, and textures due to single work, manufacturing productivity of lasting graphics, reduction of system costs, etc.

When flexibility in designing is secured, it is possible to easily manufacture products completely into other shapes and customers can express their own individuality.

It is possible to completely implement different colors, effects, and textures when products are taken out from a mold through IMD. When a certain factor of these factors is changed, it is not required to perform tuning again or change the color of resin. It is possible to dramatically change an external appearance or a texture if only simply changing a film.

When IMD is used, a graphic "that continues long" is protected between a film and resin. Unlike existing surface graphics that may come off, it is impossible to remove a rear IMD graphic without damaging a product.

Further, when IMD is used, secondary work and labor are reduced, an adhesive is also not required, and system costs are reduced in many application fields.

An IMD process is as follows.

1. Screen Printing Step

This is a step of forming a logo on a raw film material using screen printing. It is important to follow recommendations of all of manufacturers.

2. Film Molding Option Step

This is a step of mounting a film into a mold and it is important a molding insert is appropriately fitted in an injection molding tool to obtain an inmold product with a good quality. There are several film molding options.

3. Injection Molding Step

This is a step of integrally transcribing a logo printed on the film mounted in the mold by injection a liquid-state cast-iron product into the mold, and molding by inmold is not greatly different from other molding. However, it is very important to design a tool in order to obtain a part with a good quality and implement appropriate molding trimming.

However, the following problems are generated even in IMD.

There are many problems, similar to other injection molding methods, such as tuning-off of ink washing, delamination of a molded product, a texture like an orange peel on a lens, wrinkles, appearance of stress lines when seen through a polarizing filter, a poor graphic, poor graphic registration, blurring or whitening of a graphic, resin wrapping in a wrong direction, non-drying of a material, a defect like an orange peel on the surface of a molded film, bubbles of a pin-sized vacuum space, excessive sagging of a film, incomplete molding, poor details, sagging variation between film gaps, generation of a web patter or wrinkles during molding, fixation of a film on a mold, and tearing of a film in molding.

Methods for solving these problems depend on circumstances, but specific problems are generated due to the characteristics of the materials of films in many cases.

As materials that are used to make a logo label for IMD, there are various materials such as PC, PET, ABS, silicone, and urethane.

Polyurethane have advantages of shock, friction, cutting tearing, excellent formability, chemical resistance, ozone resistance, oil resistance, high elongation, etc.

As described above, materials that are used for films have relative advantages and disadvantages, but a manufactured logo label needs to have both of high hardness and ductility. When ductility is low and a logo label is attached to clothing almost not having stiffness, the clothing and the logo label are not integrated, and when such a logo label is attached to a bending portion of a shoe, a bag, etc., the logo label is easily separated in use. Accordingly, ductility is very important for materials of a logo label.

The greatest advantage of logo labels made of a polyurethane film is high ductility, so even though such logo labels are attached to a bending portion of a shoe or a bag, they are seen like metal without a sense of mismatch.

However, when a logo label is thick and is attached to cloth, ductility is deteriorated and a sense of mismatch is generated even though the logo label is a polyurethane logo label with high ductility, so a wing film is thermally bonded to the bottom of a polyurethane logo label through injection molding. It is important to thermally bond a wing film through injection molding in terms of cohesion and separation due to variation of temperature. Further, an image film is transcribed to the surface of a polyurethane logo label at a portion exposed to the outside through injection molding.

As an embodiment according to the present disclosure, a process of transcribing an image film to a polyurethane logo label through IMD and thermally bonding a wing film is as follows. As shown in FIGS. 1 to 9, a mold divided into a top plate 110, a mid-plate 120, and a bottom plate 130 is prepared, and an image film 210 and a wing film 220 are prepared. The image film 210 is made of a polyurethane material, and when a logo label 200 is injection-molded, the image film 210 is transcribed to the front surface of the logo label 200 to clearly show a logo. The wing film 220 is integrated with the logo label 200 and extends like a wing along the outer edge of the logo label 200.

A plurality of logo grooves 132 is formed in a desired logo shape with regular intervals on the bottom plate 132. The number of the logo grooves 132 can be increased of decreased, depending on the size of a mold or the size of a logo. The logo grooves 132 are places that are filled with polyurethane resin. Seat grooves 134 are formed at the portions where the logo grooves 132 are formed on the surface of the bottom plate 130. Film holders 135 for fixing the wing film 220 in injection molding are formed at the seat grooves.

The seat grooves 134 are formed 2~5 mm wider than the edge of the logo grooves 132 and are formed with a depth the same as the thickness of the wing film (polyurethane+ PET film). The wing film 220 is laminated by bonding a PET film 220*b* to a polyurethane film 220*a*, and is maintained in a laminated state and prevents deformation of the polyure- thane film 220*a* before the logo label 210 is attached to cloth 300.

When the width of the seat grooves 134 is larger by 2~5 mm than the edge of the logo grooves 132, a wing (a wing film of an extending portion like a wind along the edge of a logo) that is 2~5 mm wider than the edge of a logo is formed. When the logo label 210 is attached to cloth, a wing increases cohesion, reduces a sense of mismatch, and is important in maintaining a watertight state.

Figure 2:
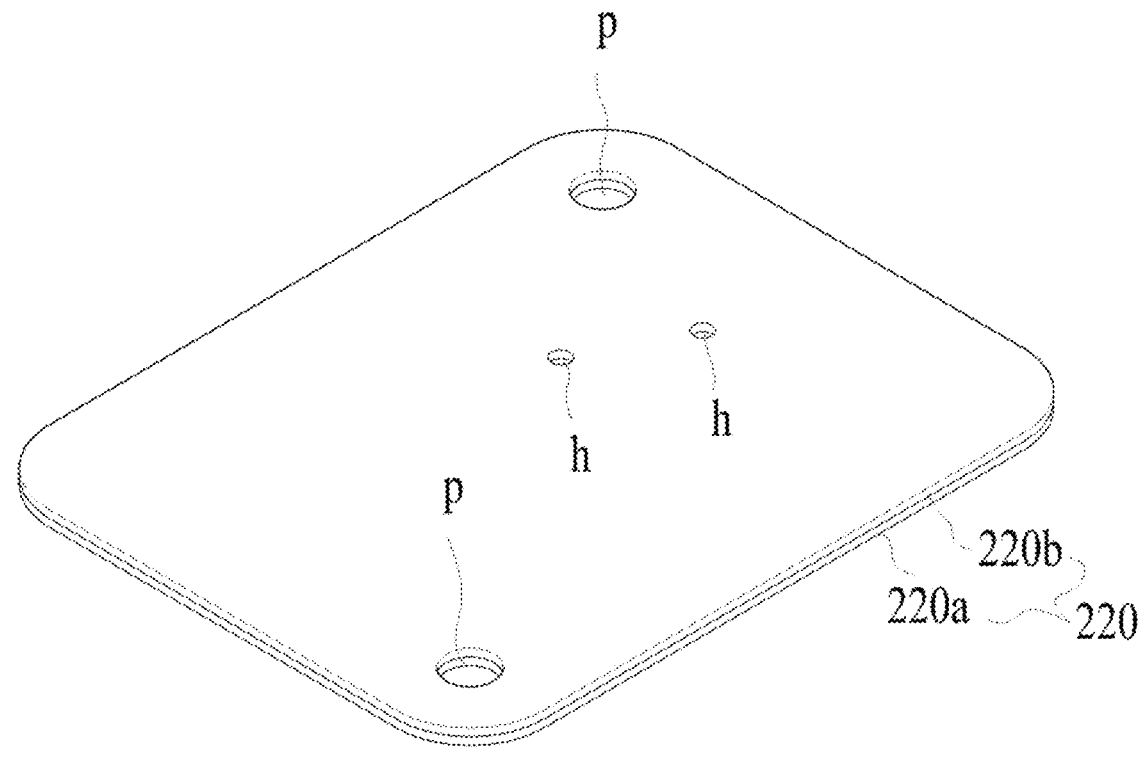
FIG. 2 shows a wing film according to an embodiment of the present disclosure.
Figure 3:
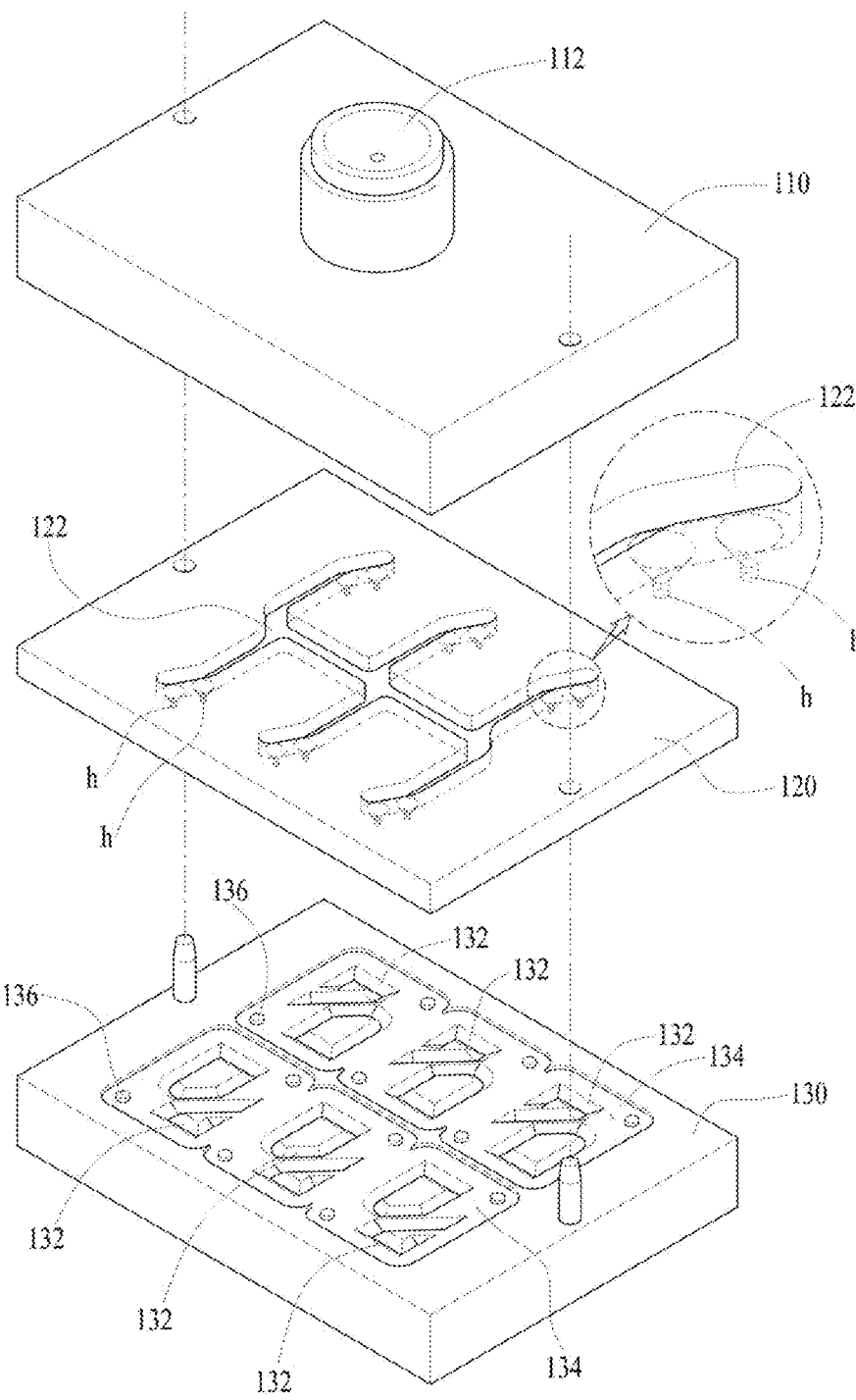
FIG. 3 is an exploded view of a mold according to an embodiment of the present disclosure.
Figure 4:
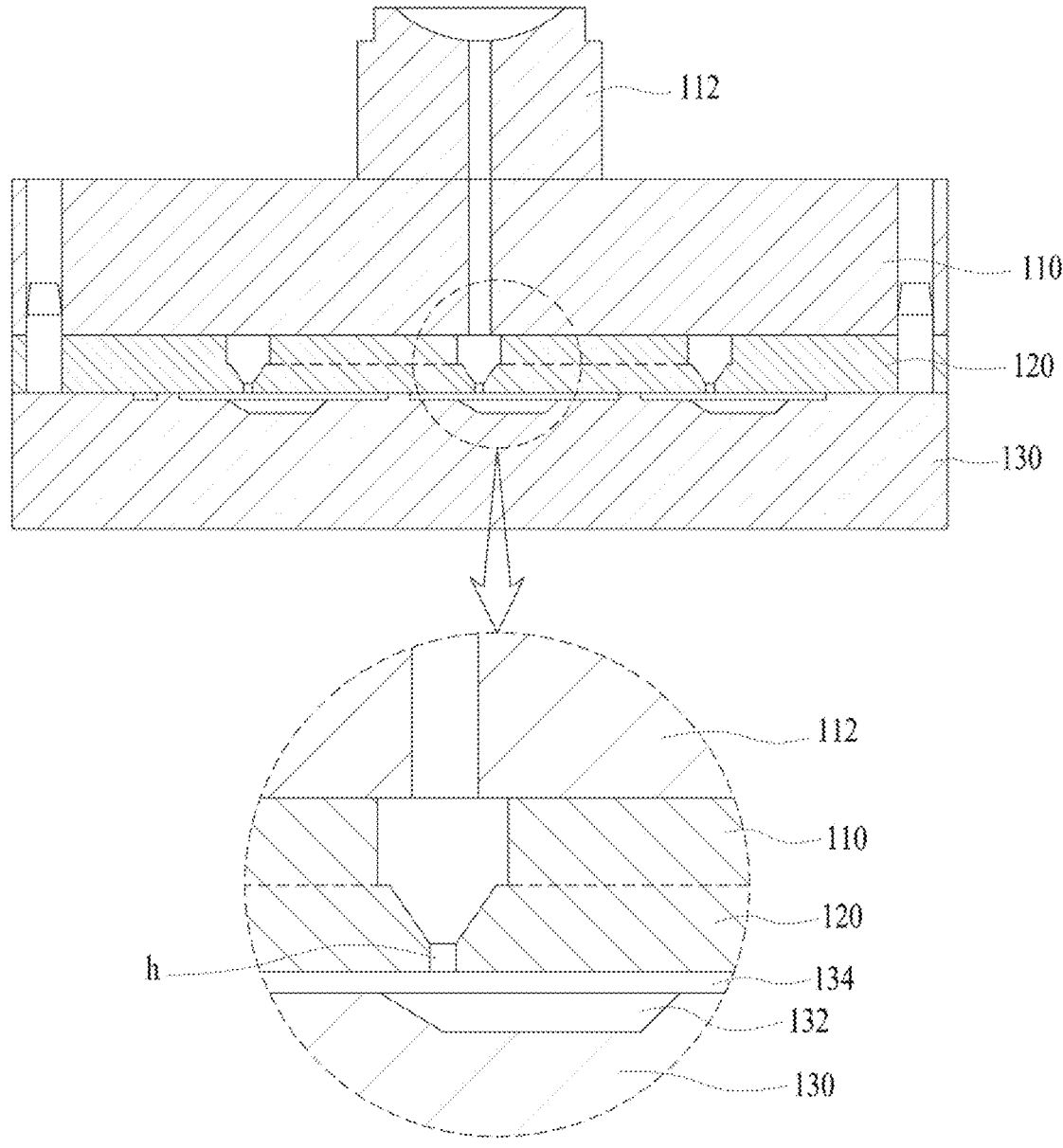
FIG. 4 is an assembled cross-sectional view of the mold according to an embodiment of the present disclosure.
Figure 5:
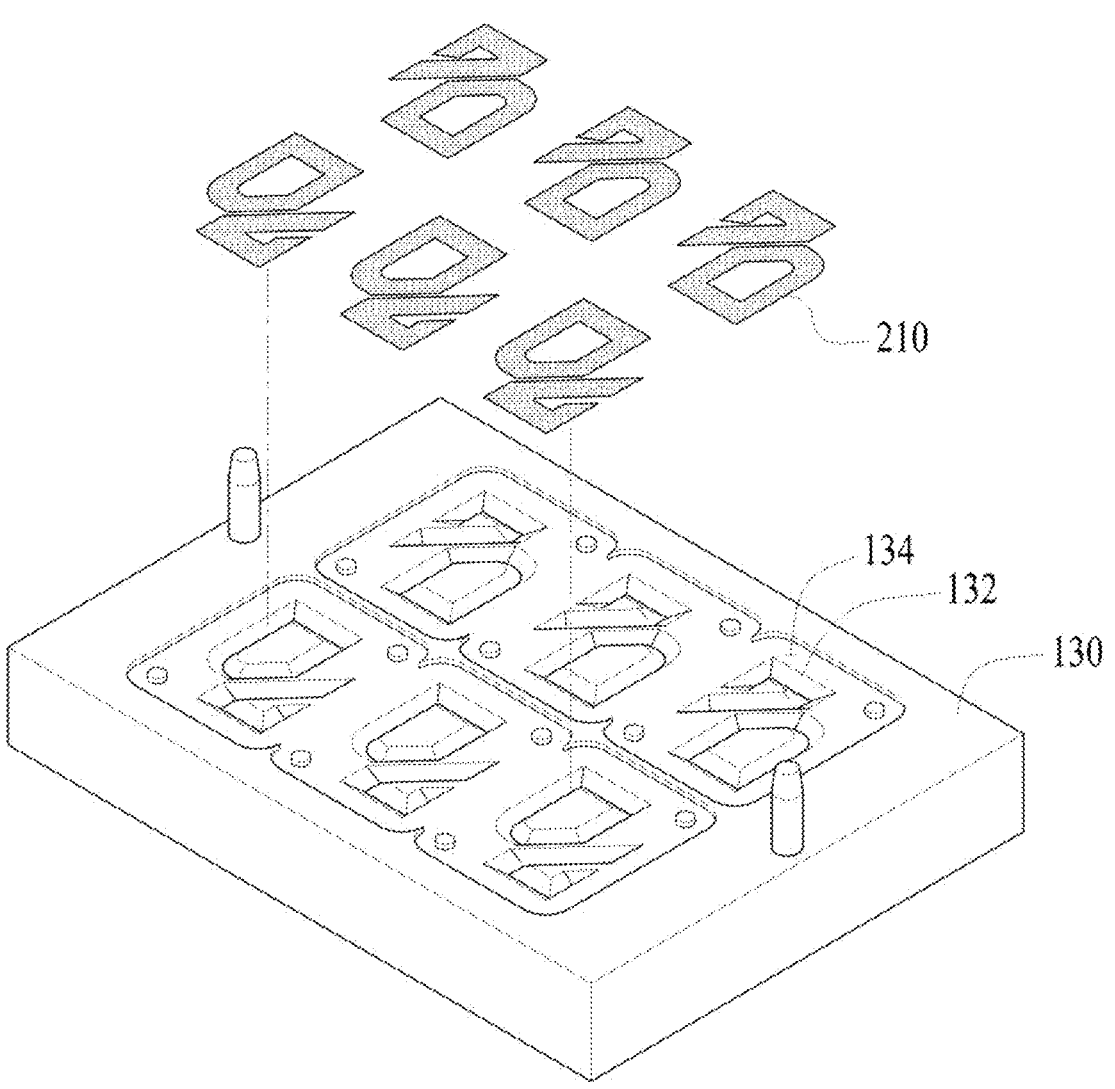
FIG. 5 shows that image films are seated in logo grooves of a bottom plate of the mold according to an embodiment of the present disclosure.
Figure 6:
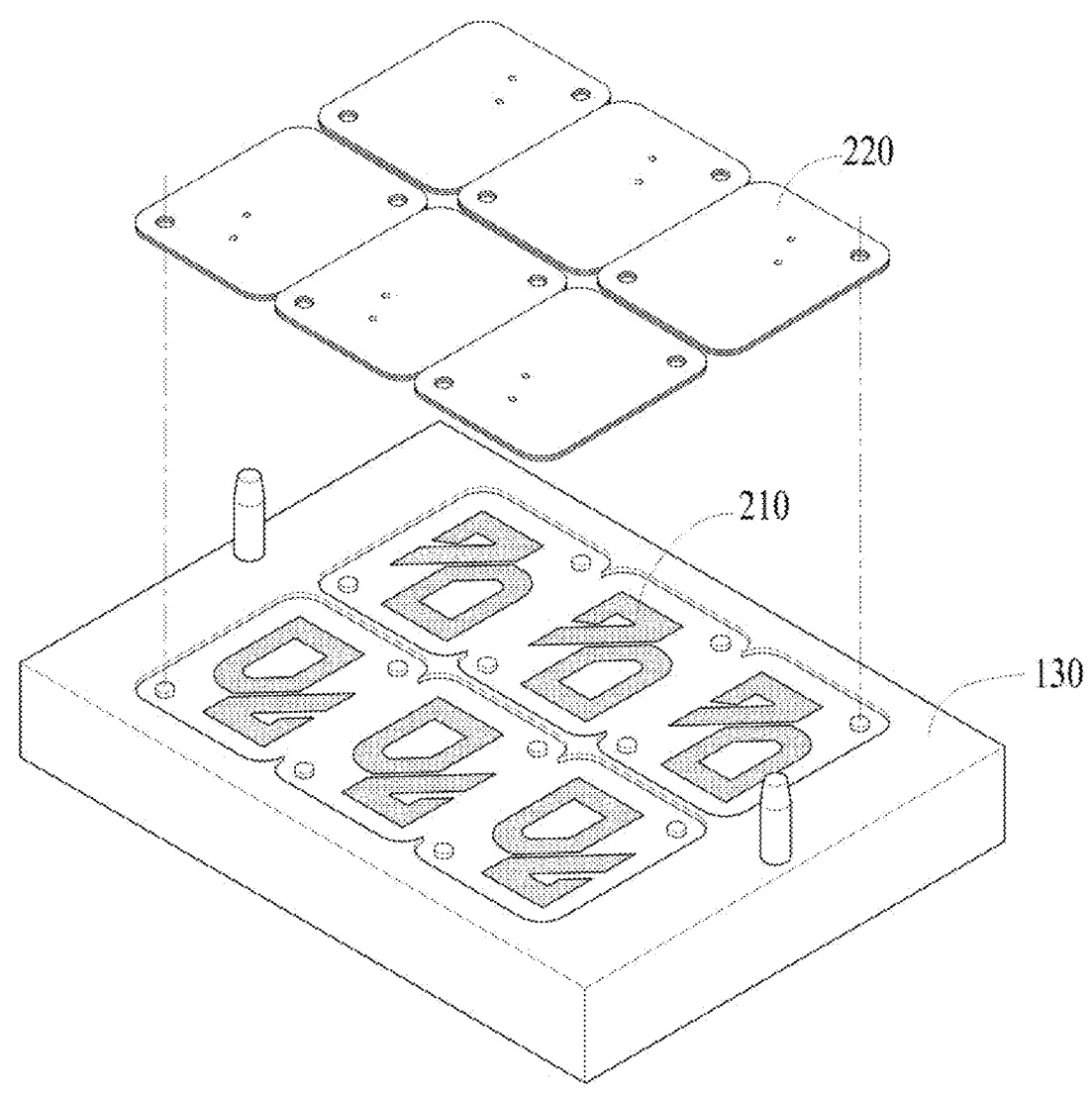
FIG. 6 shows that wing films are seated in seat grooves of the bottom plate of the mold according to an embodiment of the present disclosure.
Figure 7:
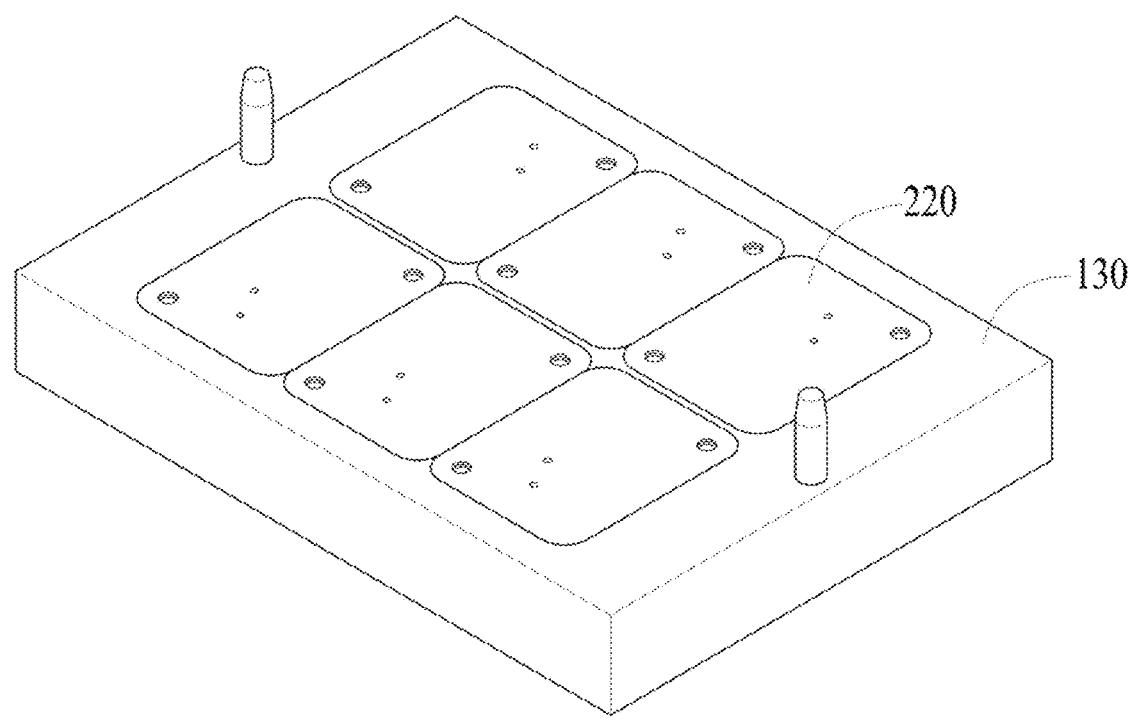
FIG. 7 shows that image films and wing films have been seated of the bottom plate of the mold according to an embodiment of the present disclosure.
Figure 8:
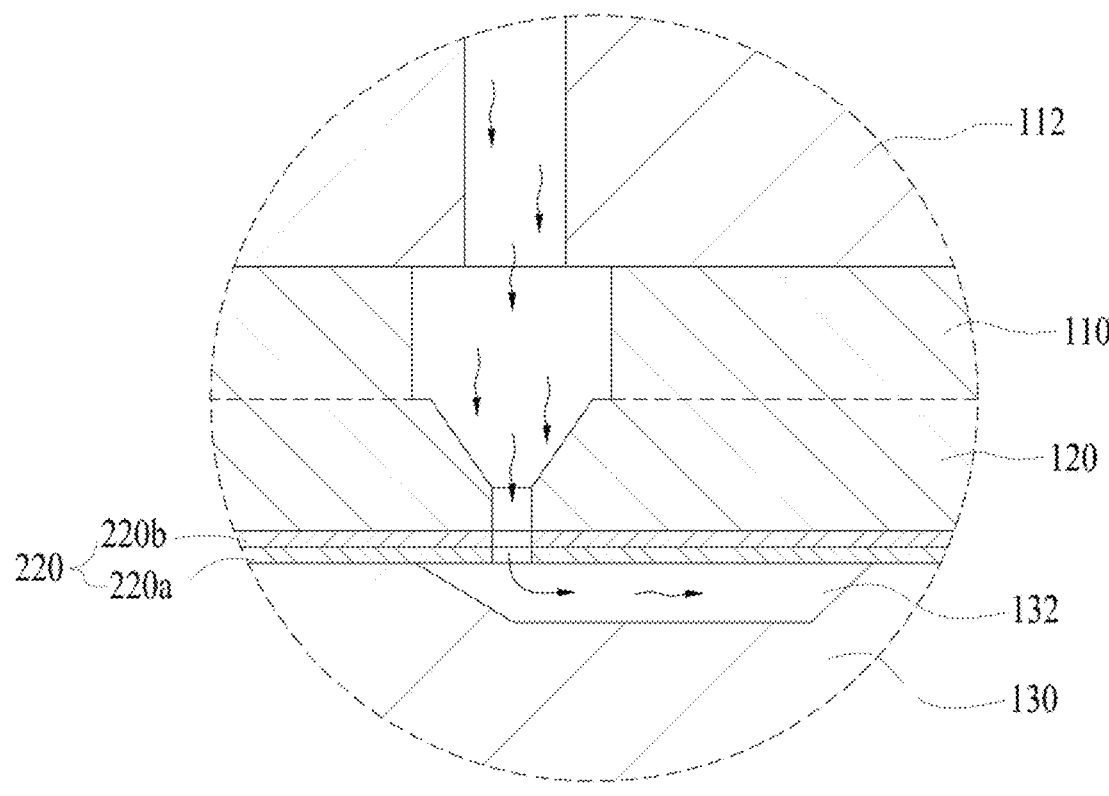
FIG. 8 shows a process in which polyurethane resin is injected into the mold according to an embodiment of the present disclosure.
Figure 9:
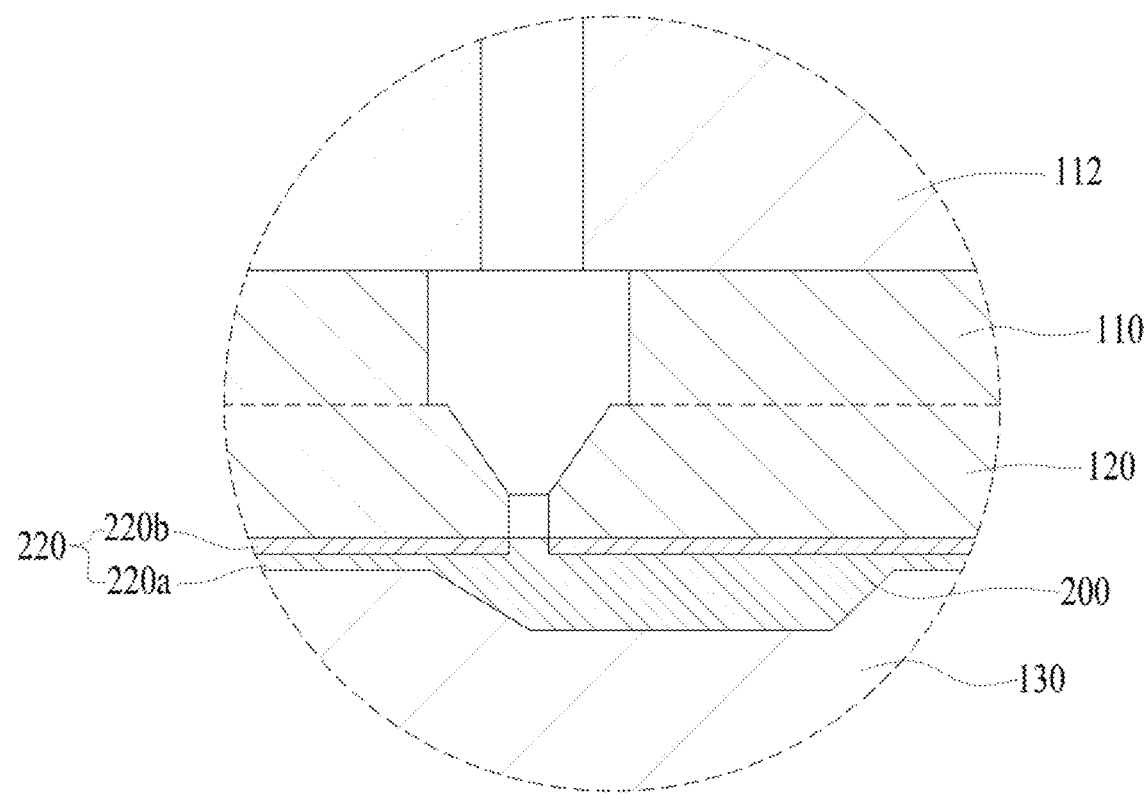
FIG. 9 shows the state in which polyurethane resin has been injected and hardened in the mold according to an embodiment of the present disclosure.

Two film fixing holes p that are fitted on the film holders 136 of the seat grooves 134 and two injection holes h connected to the logo grooves 132 are formed on a side of the wing film 220. The reason of forming two injection holes h at the wing film 20 is for injecting polyurethane resin into the logo grooves, respectively, because the logo grooves 132 are separated into two discontinuous sections, as shown in FIG. 2. When the logo grooves 132 are separated into three discontinuous sections, three injection holes h should be formed at the logo grooves 132.

The mid-plate 120 is assembled on the bottom plate 130. The mid-plate 120 is assembled to overlap the bottom plate 130, thereby covering and closing the logo grooves 132 and the seat grooves 134. Channel grooves 122 are formed on the top of the mid-plate 120 so that polyurethane resin can be injected into the logo grooves 132 and the seat grooves 134 while flowing in injection molding, and injection holes h corresponding to the injection holes h formed at the wing film 220 are formed on the channel grooves 122. That is, when polyurethane resin is injected in to the injection holes h of the mid-plate 120, the polyurethane resin directly flows into the injection holes h of the wing film 220.

The top plate 110 is assembled on the mid-plate 120. The top plate 110 is assembled to overlap the mid-plate 120 to close the channel grooves 122, and an injection inlet 112 is formed at the center of the top plate 110. The injection inlet 112 is a portion through which polyurethane resin is injected.

A polyurethane logo label manufacturing process accord- ing to the present disclosure configured as described above is described hereafter.

First, the image films 210 are seated in the logo grooves 132 of the bottom plate 130, the wing films 220 are seated in the seat grooves 134 such that the polyurethane film 220*a* faces down, the mid-plate 120 and the top plate 110 are combined, and then polyurethane resin at 200~2800□ is injected through the injection inlet 112. When polyurethane resin is injected, the polyurethane resin flows inside and flows through the injection holes h formed at the channel grooves 122, and fills the logo grooves 132 through the injection holes h formed at the wing films 220.

The logos formed on the image films 210 are transmitted and integrated by the polyurethane resin in the logo grooves 132, and when the polyurethane resin is slowly cooled and hardened in the mold while a portion of the surface of the polyurethane films 220*a* of the wing films 200 is melted by the early-stage heat of the polyurethane resin, the polyure- thane resin and the wing films 220 are integrated. The polyurethane resin hardened in the logo grooves 132 becomes logo labels 200. Accordingly, when the mold is separated and a logo label 200 is taken out of a logo groove 132, the image film 210 has been transcribed on the front surface of the logo label 200 and the wing film 220 has been integrated to the bottom of the logo label 200.

The wing film 220 is laminated by combining the poly- urethane film 220*a* and the PET film 220*b*, and thermal- bonding to polyurethane resin in injection molding with the PET film laminated is very important to prevent deformation of the polyurethane film 220*a* due to the characteristic of the polyurethane film 220*a* that has excellent ductility but is easily deformed by external force.

Further, it is very important that the wing film 220 is coupled to the logo label 200 through injection molding in a high-temperature polyurethane resin state, in terms of cohesion of the logo label 200 and the wing film 220. When polyurethane resin is injected into the mold, polyurethane resin is cooled at the moment, and the early-stage heat is at the highest temperature, so, in the early stage, a portion of the polyurethane film 220*a* of the wing film 220 is melted by the polyurethane resin and the polyurethane resin is cooled and hardened, whereby the logo label 200 and the wing film are thermally bonded.

However, when the logo label 200 and the wing film 220 are combined using an adhesive not through injection mold- ing in a resin state, the adhesive is easily separated when temperature is repeatedly changed in use because a sepa- rable material with respect to the logo label 200 made of a polyurethane material and the polyurethane film 220*a* of the wing film 220 made of a polyurethane material. Further, even though the logo label 200 and the wing film 220 are injection-molded in a mold, the method of applying heat to the mold with the logo label 200 in a solid state rather than a resin state, melting a portion of the logo label 200 and melting a portion of the wing film 220 using the heat such that they are combined, and then cooling the mold causes not only a difference in cohesion, but cannot melt the surface of the joint of the logo label 200 and the wing film 220 by a desired level, and the cohesion is also deteriorated.

A method of attaching a polyurethane logo label formed in accordance with an embodiment of the present disclosure described above is described hereafter.

Figure 10:
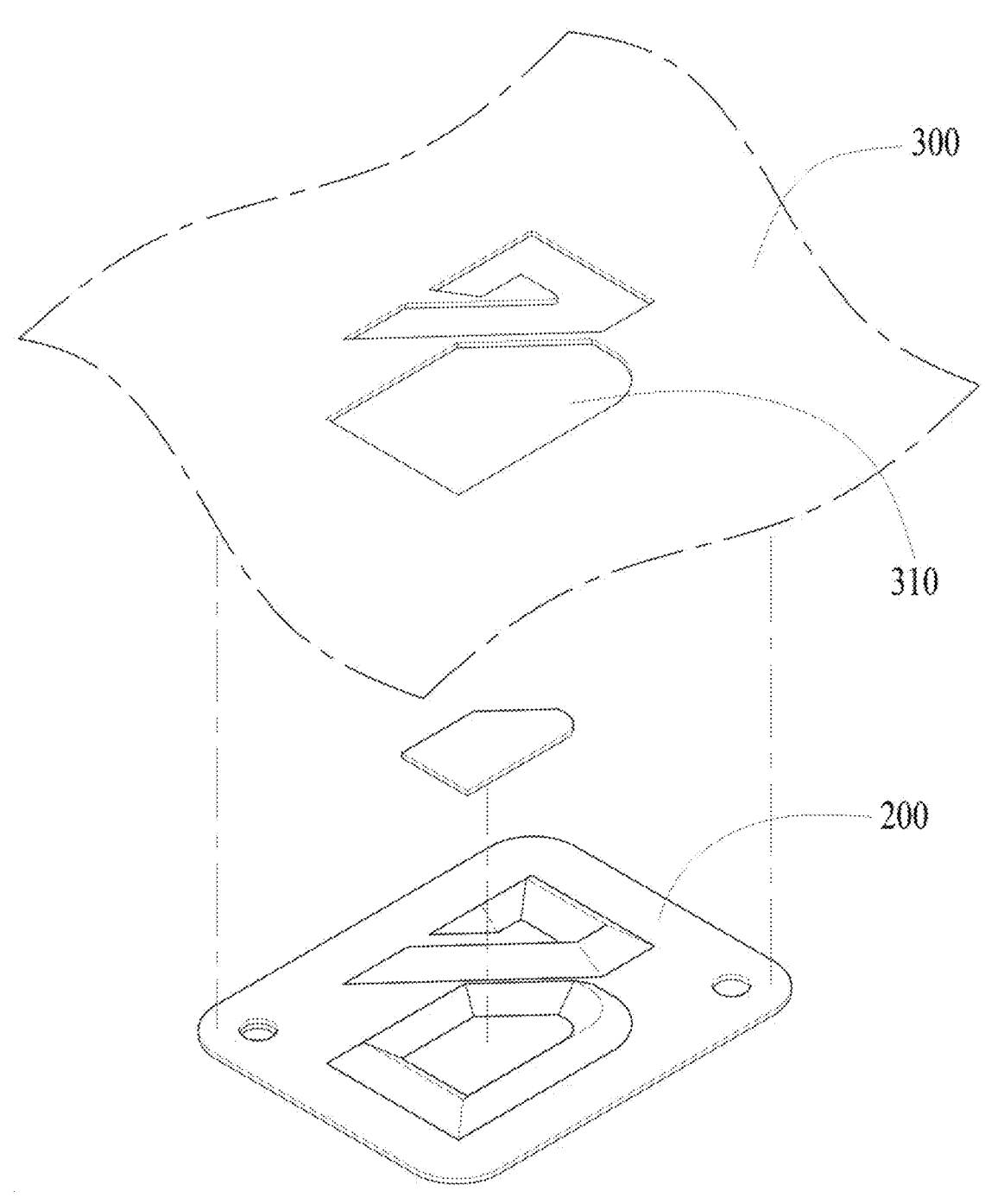
FIG. 10 shows attaching a logo label according to an embodiment of the present disclosure to cloth.
Figure 11:
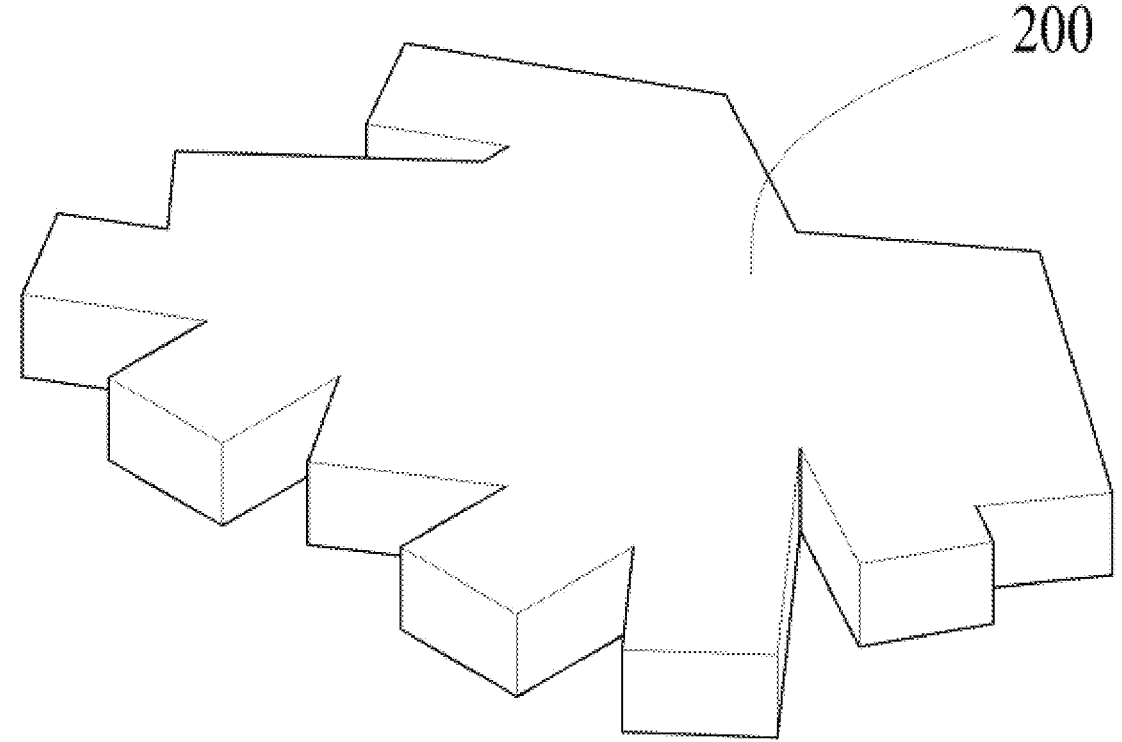
FIG. 11 shows an injection-molded logo label according to another embodiment of the present disclosure.
Figure 12:
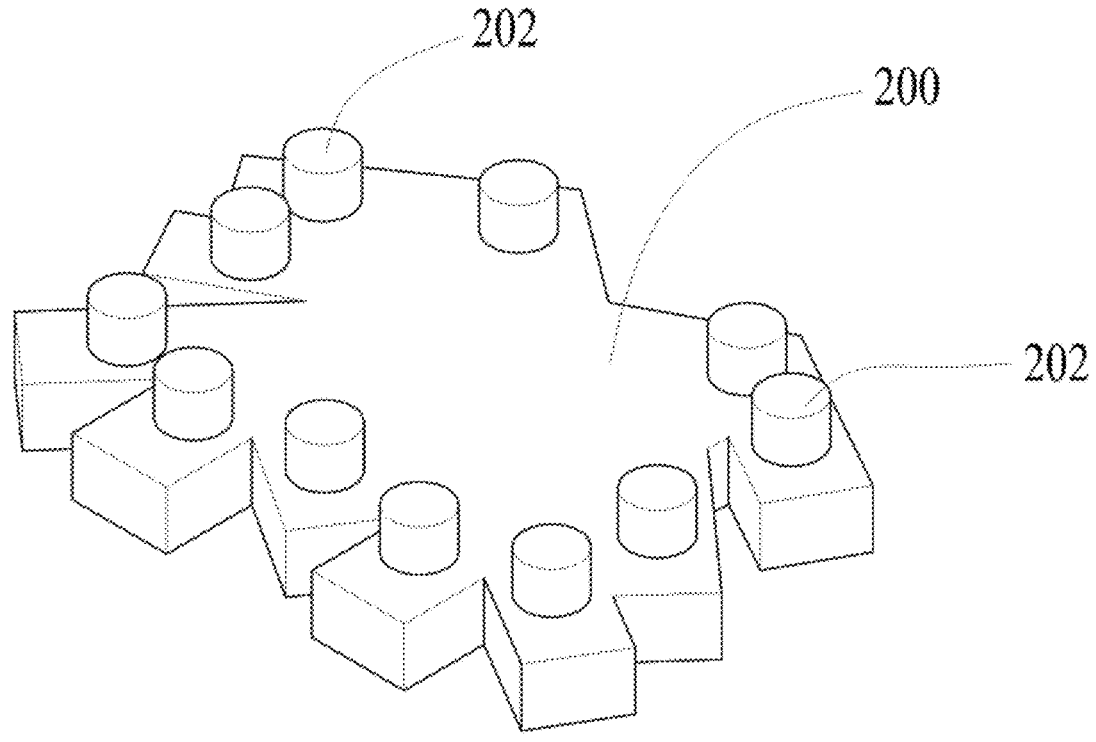
FIG. 12 a bottom perspective view of the injection-molded logo label according to another embodiment of the present disclosure.
Figure 13:
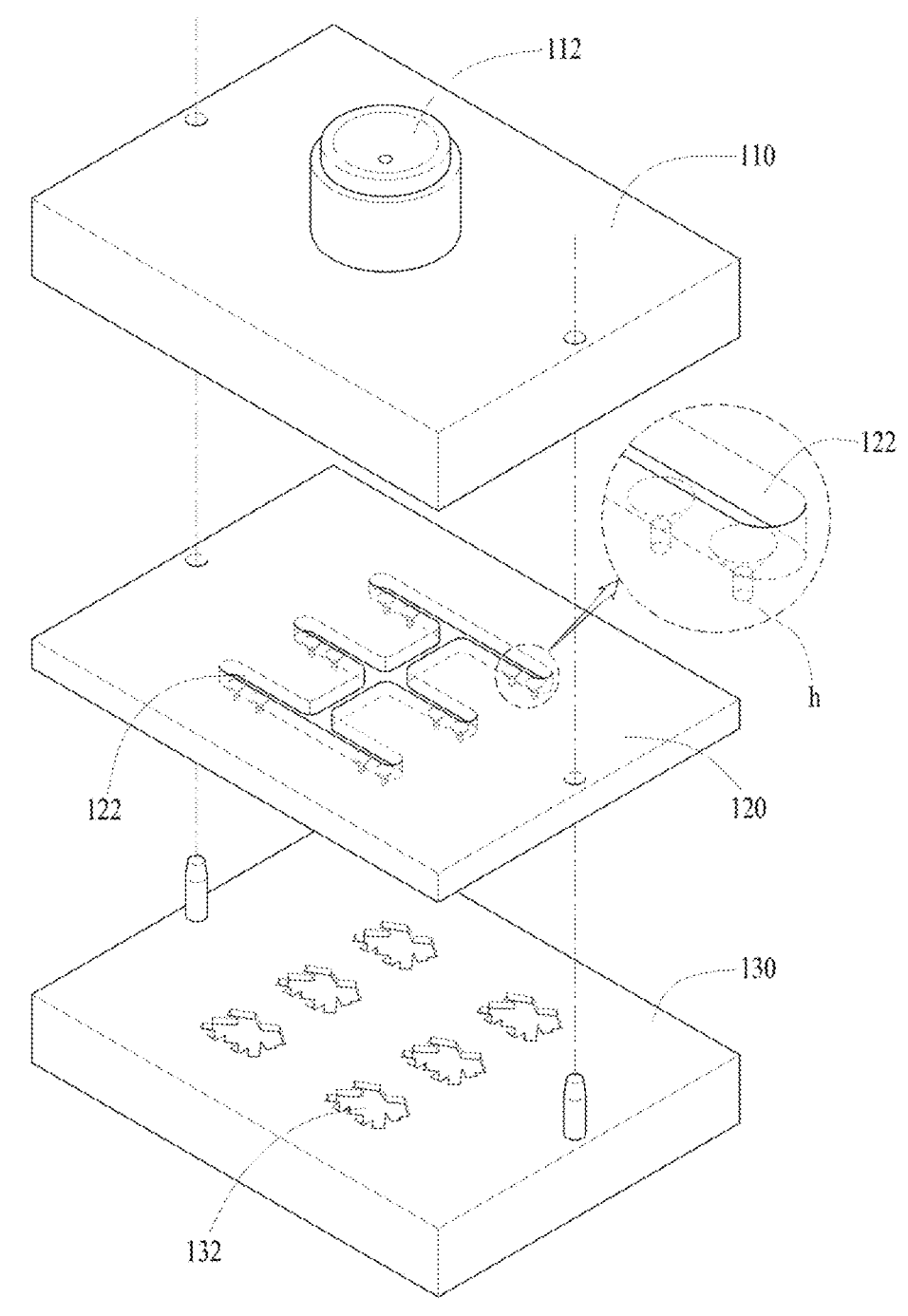
FIG. 13 is an exploded view of a mold according to another embodiment of the present disclosure.
Figure 14:
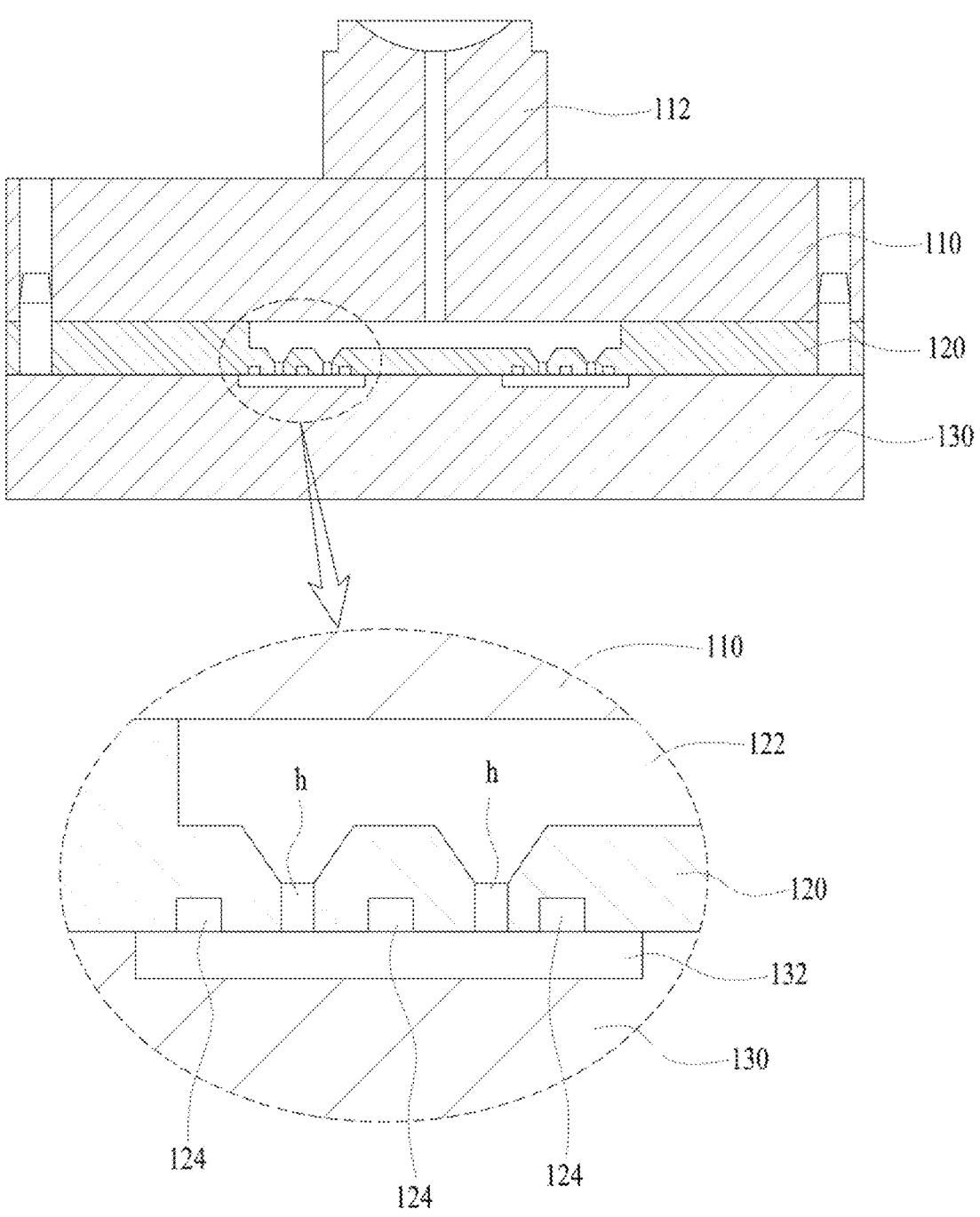
FIG. 14 is an assembled cross-sectional view of the mold according to another embodiment of the present disclosure.
Figure 15:
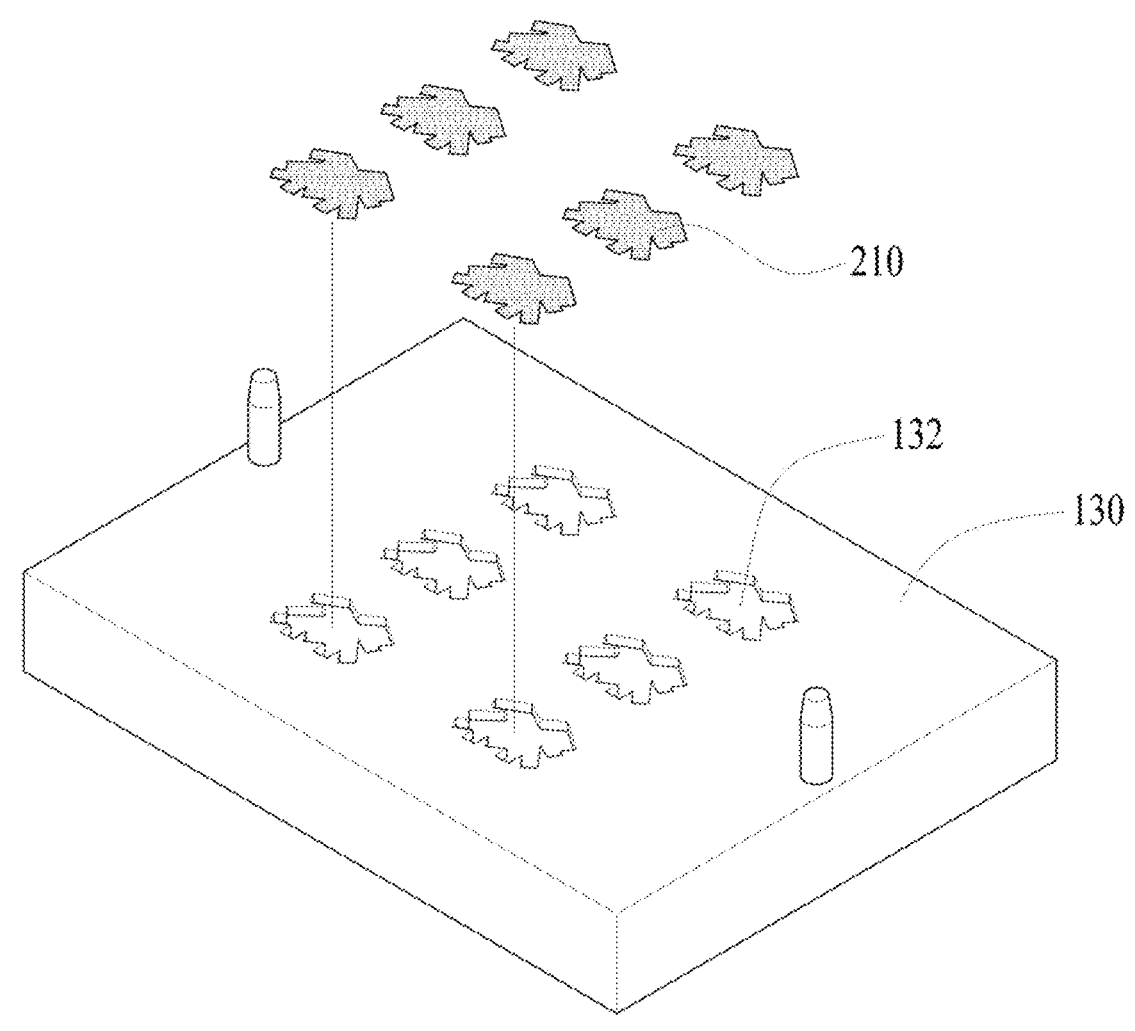
FIG. 15 shows a process in which image films are seated in logo grooves of a bottom plate of the mold according to another embodiment of the present disclosure.
Figure 16:
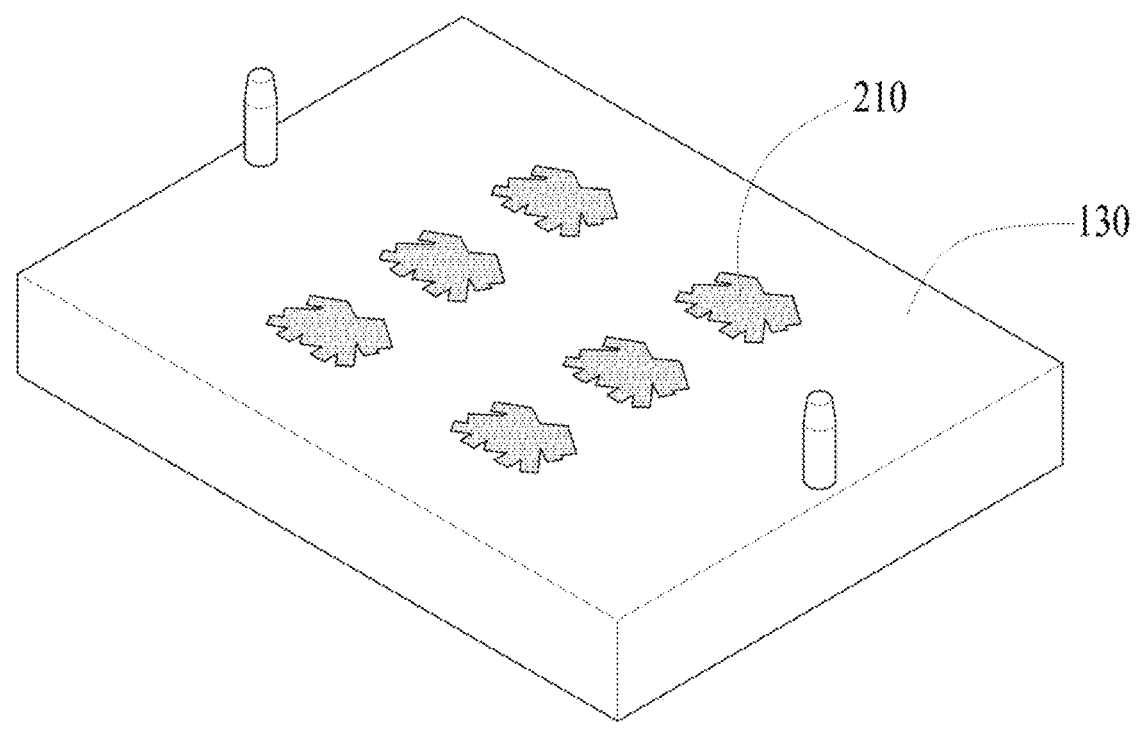
FIG. 16 shows the state in which image films have been seated in the logo grooves of the bottom plate of the mold according to another embodiment of the present disclosure.
Figure 17:
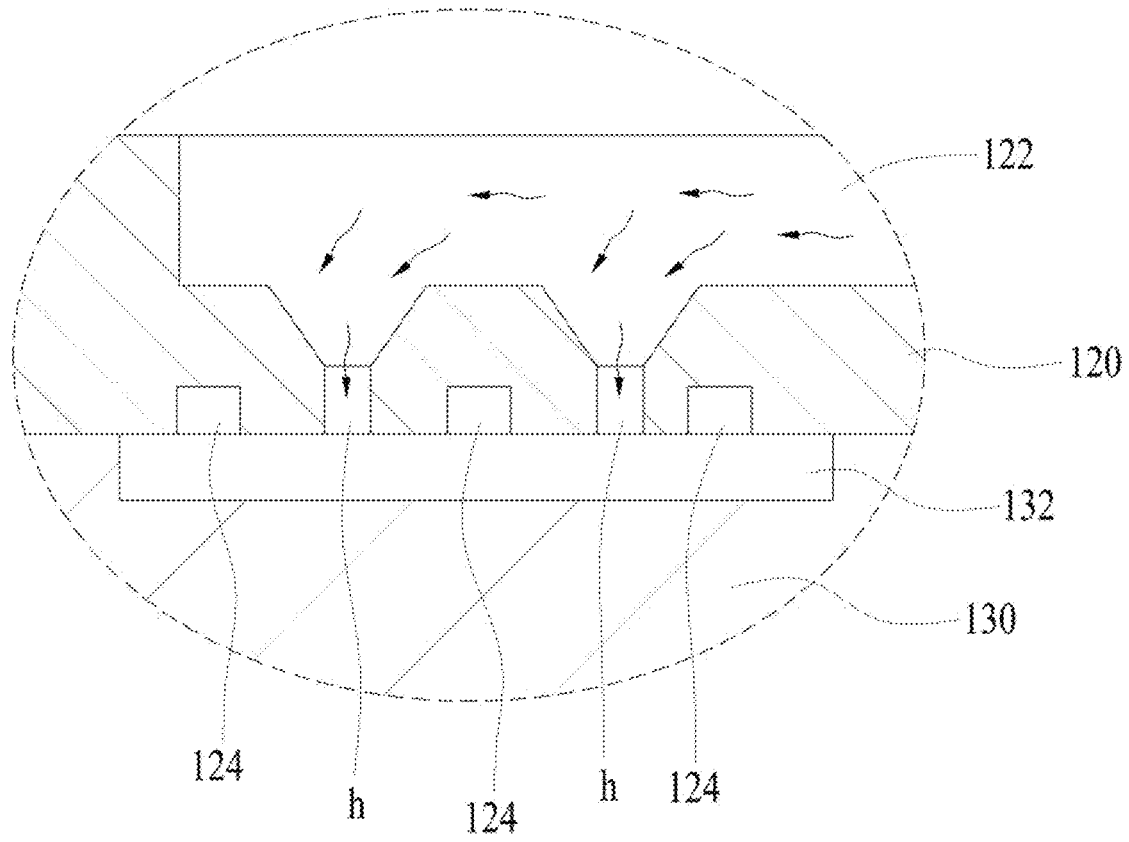
FIG. 17 shows a process in which polyurethane resin is injected into the mold according to another embodiment of the present disclosure.
Figure 18:
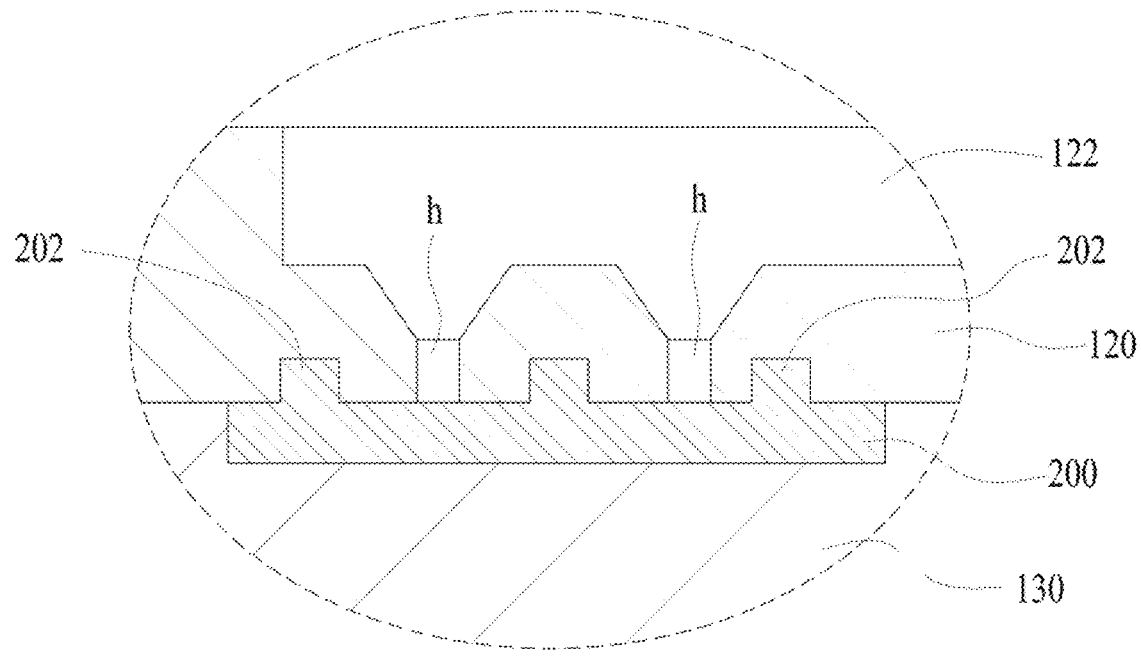
FIG. 18 shows the state in which polyurethane resin has been injected and hardened in the mold according to another embodiment of the present disclosure.

As shown in FIG. 10, a logo label 200 with a wing film 220 integrally thermally bonded on the bottom is prepared.

A logo-shaped bored portion 310 is formed by cutting cloth 300, to which the logo label 200 is supposed to be attached, in the same shape as the logo.

The logo label 200 of the step 1 is placed such that the wing film 200 is positioned inside the cloth 300 with the logo-shaped bored portion 310, a urethane primer layer and a hot melt layer are applied to the wing film 220, and then the cloth 300 with the logo-shaped bored portion 310 and the wing film 220 are heated and pressed such that the cloth 300 and the wing film 220 are integrally bonded by the urethane primer layer and the hot melt layer. In this process, the PET film 200*b* laminated on the polyurethane film 200*a* of the wing film 220 is removed before heat is applied for thermal bonding.

The logo label 220 is attached to the cloth 300, as described above, but the object that is actually attached to the cloth 300 is the wing film. Cloth 300 such as hiking wares is elastic and coated on the surface in many cases, and when a thick logo label 200 is directly attached to the cloth 300, the logo label 200 does not follow contraction and extension of the cloth 300 even though the logo label 200 is made of a polyurethane material having excellent ductility, so the coupled portion is wrinkled or the cohesion is deteriorated, whereby the logo label 200 may be separated in use and water may permeates inside through the coupled portion. However, when the thin wing film 220 made of a polyurethane material is attached, as in the present disclosure, the wing film 220 follows deformation by contraction and extension of the cloth 300 because the wing film 220 is made of a polyurethane material and thin and has excellent elasticity, so wrinkles are not formed at the coupled portion, a visual sense of mismatch is small, and watertightness is maintained, whereby water cannot permeate inside through the coupled portion.

Another embodiment of the present disclosure is described hereafter.

The difference of another embodiment of the present disclosure form an embodiment is that there is no wing film and a washer film made of a polyurethane material is used for attachment to cloth. The logo label 200 according to an embodiment is formed by connecting lines like a character, but there is one having a large area without a line. When lines are connected, only the line portions protrude, so only the line portions have to be bored for attachment to cloth. However, when there is no line, cloth has to be bored by the size of an entire logo label. The more the portion (area) to be bored, the more the damaged portion of cloth, so the basic structure of the cloth is changed and elasticity is deteriorated, whereby cohesion with the cloth is also deteriorated. Accordingly, a method of minimizing a damaged portion of cloth and increasing cohesion with cloth when attaching a logo label with a relatively large area was invented.

As another embodiment of the present disclosure, a process of transcribing an image film to a polyurethane logo label through IMD and forming legs is as follows. As shown in FIGS. 11 to 18, a mold divided into a top plate 110, a mid-plate 120, and a bottom plate 130 are prepared.

A plurality of logo grooves 132 is formed in a desired logo shape with regular intervals on the bottom plate 130. The number of the logo grooves 132 can be increased of decreased, depending on the size of a mold or the size of a logo. The logo grooves 132 are places that are filled with polyurethane resin.

The mid-plate 120 is assembled on the bottom plate 130. The mid-plate 120 is assembled on the bottom plate 130, thereby covering and closing the logo grooves 132. Path grooves 122 are formed on the top of the mid-plate 120 so that polyurethane resin can be injected into the logo grooves 132 while flowing.

A plurality of leg holes 224 that becomes legs 202 of the logo label 200 when polyurethane resin injected and hardened in the logo grooves 132 is formed on the bottom of the mid-plate 120 to be connected to the logo grooves 132. The depth of the leg hole 224 is the leg length of the logo label 200, so the depth of the leg hole 224 (the thickness of the mid-plate) is determined in consideration of the thickness of cloth.

The top plate 110 is assembled on the mid-plate 120. The top plate 110 is assembled on the mid-plate 120 to close the path grooves 122, and an injection inlet 112 connected with the path grooves 122 is formed at the center of the top plate 110.

A method of attaching a polyurethane logo label of another embodiment described above to cloth is as follows.

Figure 19:
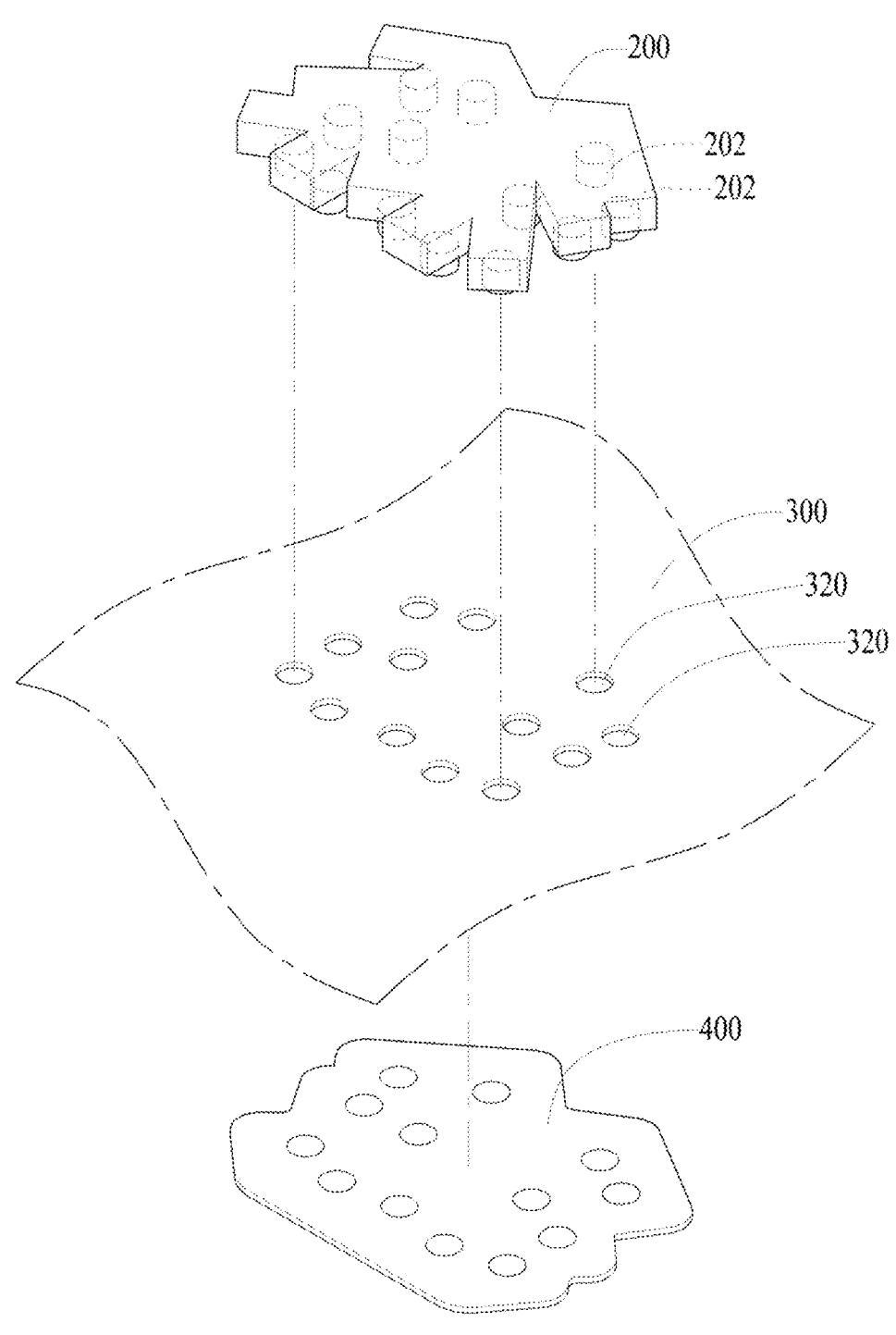
FIG. 19 shows attaching a logo label according to another embodiment of the present disclosure to cloth.

As shown in FIG. 19, a logo label 200 with legs 202 integrally thermally bonded on the bottom through injection molding is prepared.

Holes 320 are formed at cloth 300, to which the logo label 200 is supposed to be attached, in the same shape as the cross-section of the legs 202 of the logo label 200 and by the number of the legs 202.

The legs 202 of the logo label 200 are inserted into the holes 320 from the outside of the cloth 300, whereby the legs 202 protrude inside the cloth 300. Wash films 400 made of a polyurethane material are thermally bonded to the ends of the protruding legs 202, a polyurethane primer layer and a polyurethane hot melt layer are applied to the washer films 400 and then the wash films 400 are put on the ends of the legs and are heated and pressed, whereby the legs 202 and the washer films 400 are integrally thermally bonded. That is, the logo label 200 is coupled to the cloth 300 by the washer films 400 thermally bonded to the legs 202.

In this case, the end portions of the legs 202 are pressed flat while being partially melted, thereby being thermally bonded to the washer films 400. When end portions of the legs 202 are pressed flat, the length of the legs 202 decreases and the distance between the bottom of the logo label 200 and the washer films 400 decreases and the cloth 300 therebetween is brought into close contact, whereby the gap is removed. Further, when the legs 202 are pressed flat, the flat portions are stuck in the holes 320 of the cloth 300, thereby serving to increase cohesion as well.

DESCRIPTION OF REFERENCE NUMERALS

110: Top plate
112: Injection inlet
120: Mid-plate
122: Channel grooves
130: Bottom plate
132: Logo grooves
134: Seat grooves
136: Film holders
200: Logo label
202: Legs
220: Wing film
220*a*: Polyurethane film
220*b*: PET film
224: Leg hole
300: Cloth
310: Logo-shaped bored portion
320: Holes
400: Washer films

What is claimed is:

1. A polyurethane logo label manufacturing method comprising:

a first step of preparing a polyurethane image film printed with a logo;

a second step of preparing a wing film laminated by combining a polyurethane film and a PET film;

a third step of forming an injection hole for injection into a logo groove of the wing film;

a fourth step of film molding option of preparing a mold composed of a top plate, a mid-plate, and a bottom plate, that is, of preparing a bottom plate on which a logo groove having the same shape as a logo and having depth by a thickness of the logo is formed and a seat groove having the same shape as the wing film and having a depth by a thickness of the wing film is formed, of preparing a mid-plate closing the logo groove and the seat groove by being assembled to overlap the bottom plate, having a path groove, through which polyurethane resin can flow, on a top thereof, and having an injection hole formed at the path groove to be connected with the injection hole of the wing film, of preparing a top plate closing the path groove by being assembled to overlap the mid-plate and having an injection inlet, through which polyurethane resin can be injected, on a top thereof, and then of inserting the image film onto a bottom of the logo groove of the bottom plate, and of inserting the wing film into the seat groove, thereby mounting the wing film into the mold; and a fifth step of injection molding of injecting polyurethane resin into the logo groove through the injection inlet of the top plate of the fourth step such that the portion between the image film and the wing film is filled with the polyurethane resin, a logo of the image film is transcribed and thermally bonded to a front of the polyurethane resin by heat of the polyurethane resin, a polyurethane film of the wing film is partially melted by heat of the polyurethane resin and integrally thermally bonded to a bottom of the polyurethane resin, and then of separating the mold.

*   *   *   *   *